April 21, 1942.  E. F. LOWEKE  2,280,153
FLUID PRESSURE PRODUCING DEVICE
Filed Aug. 16, 1940
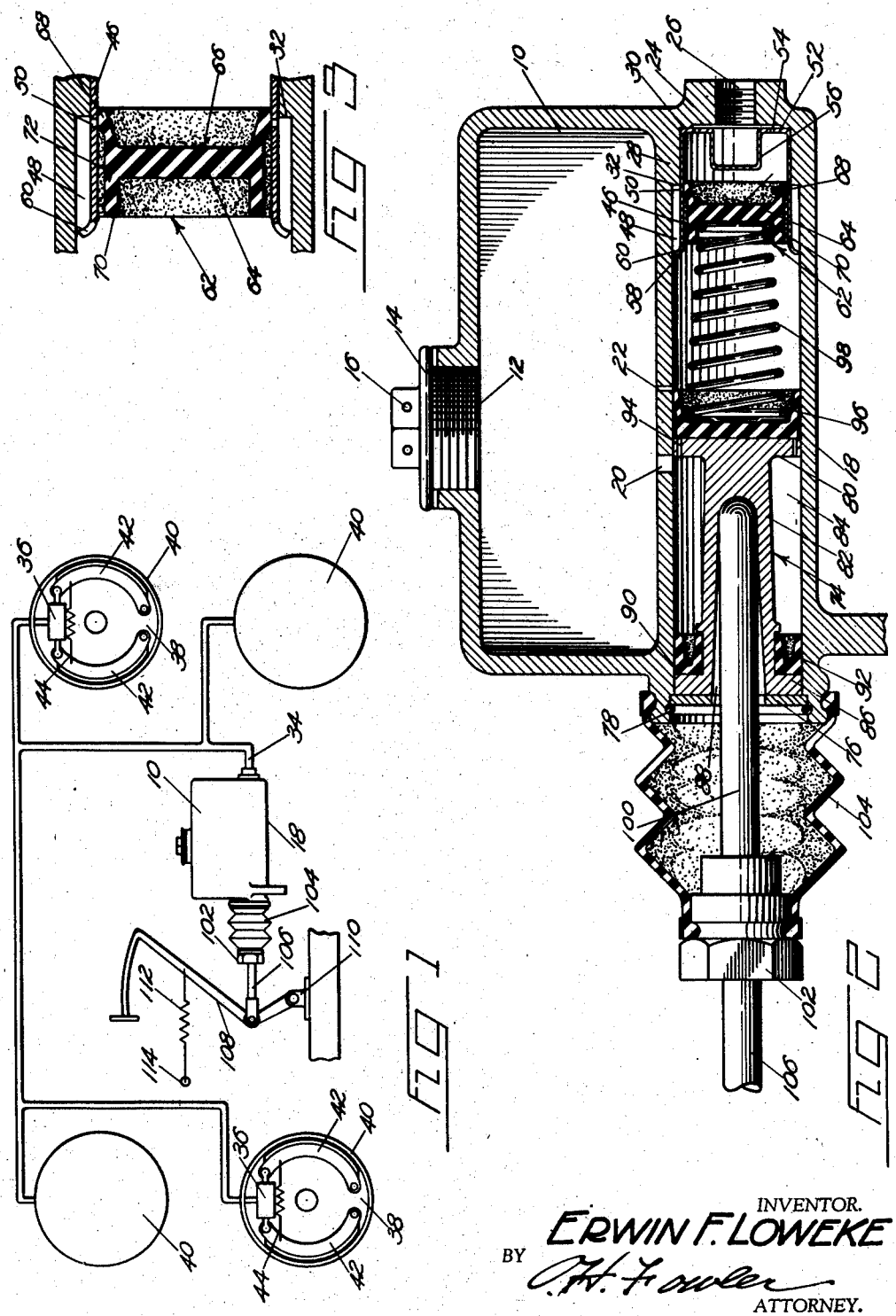
INVENTOR.
ERWIN F. LOWEKE
BY
ATTORNEY.

Patented Apr. 21, 1942

2,280,153

UNITED STATES PATENT OFFICE 2,280,153

FLUID PRESSURE PRODUCING DEVICE

Erwin F. Loweke, Detroit, Mich., assignor to Hydraulic Brake Company, Detroit, Mich., a corporation of California Application August 16, 1940, Serial No. 352,976
In Canada December 1, 1939

6 Claims. (Cl. 60—54.5)

This invention relates to fluid pressure braking systems, and more particularly to fluid pressure producing devices for such systems.

An object of the invention is to provide a fluid pressure producing device operative to continuously retain a positive pressure on the fluid in the system.

Another object of the invention is to provide a fluid pressure producing device operative to continuously retain a predetermined pressure on the fluid in the system when the device is at rest and to compensate for expansion and contraction of the fluid due to temperature changes.

Other objects of the invention will appear from the following description taken in connection with the drawing forming a part of this specification, and in which, Fig. 1 is a schematic view of a fluid pressure braking system embodying the invention;

Fig. 2 is a longitudinal sectional view of the fluid pressure producing device; and Fig. 3 is a fragmentary view illustrating the shell and floating piston.

Referring to the drawing for more specific details of the invention, 10 represents a fluid reservoir having a filling opening 12 normally closed by a plug 14 having openings 16 therethrough for venting the reservoir to the atmosphere.

A cylinder 18 at the base of the reservoir has spaced ports 20 and 22 providing communications between the cylinder and the reservoir. One end of the cylinder is open, and its other end is closed as by a head 24 having a discharge port 26.

The cylinder has at its closed end a short section 28 of reduced diameter providing at its junction with the head an annular shoulder 30 and at its junction with the main portion of the cylinder an annular shoulder 32.

A fluid pressure delivery pipe or conduit 34 suitably connected to the discharge port 26 has branches connected respectively to fluid pressure actuated motors 36, preferably arranged in pairs, one pair for actuating the brakes associated with the front wheels of a motor vehicle, and another pair associated with the rear wheels of the vehicle.

The brakes may be of any preferred structure. As shown, each of the brakes includes a fixed support or backing plate 38, a rotatable drum 40 associated with the backing plate, a pair of corresponding interchangeable friction elements or shoes 42 pivotally mounted on the backing plate for cooperation with the drum, a retractile spring 44 connecting the shoes, and a motor corresponding to the motors 36 mounted on the backing plate and connected to the shoes for actuating the shoes into engagement with the drum against the resistance of the retractile spring.

A shell 46 fitted tightly in the reduced portion 28 of the cylinder and seated on the shoulder 30 adjacent the head 24 extends into the cylinder beyond the shoulder 32 so as to provide in conjunction with the wall of the cylinder an annular passage 48 communicating with the interior of the shell by way of spaced ports 50 in the wall of the shell.

That end of the shell adjacent the head 24 of the cylinder is closed by a head 52 having a plurality of spaced ports 54 and a concentric extension protruding inwardly of the cylinder to provide a stop 56, and the other end of the shell is deformed or turned to provide a flange 58 engaging the wall of the cylinder so as to support the shell, and the flange is slotted or notched as indicated at 60 to provide free communication between the cylinder and the annular passage 48.

A piston 62, preferably of rubber, reciprocable in the shell 46 is limited on its compression stroke by the stop 56. This piston comprises a substantial body portion 64 including a head 66 having a forwardly extended marginal flange or lip 68 yieldingly embracing the wall of the shell, and a skirt 70 also embracing the wall of the shell. The piston, including the body portion, the marginal flange or lip, and the skirt has a plurality of spaced longitudinal grooves 72 in its circumference extended from the free end of the skirt well into the marginal flange or lip 68, to provide for passage of fluid past the piston in one direction, and only after the piston is advanced to its maximum allowable and is seated on the stop 56.

A piston 74 reciprocable in the cylinder 18 is held against displacement by a washer 76 seated on an annular shoulder in the open end of the cylinder and secured in place by a retaining ring 78 seated in a groove in the wall of the cylinder. The piston 74 includes a head 80, a reduced body portion 82 providing in conjunction with the wall of the cylinder an annular chamber 84 communicating with the reservoir 10 by way of the port 20, and a skirt 86 having a concentric recess or socket 88 extended well into the body of the piston and a shoulder 90 providing a seat for a sealing cup 92 for inhibiting seepage of fluid from the cylinder past the piston.

The head 80 of the piston has a plurality of spaced passages 94 therethrough providing communications between the annular chamber 84 and that portion of the cylinder 18 forward of the piston. A sealing cup 96 seated on the head 80 controls the passages 94, and a spring 98 interposed between the cup and the floating piston 62 with suitable spring seats interposed serves to retain the cup against displacement and also to impose a predetermined load on the piston 62.

A thrust pin 100 has one of its ends seated in the socket 88 of the piston 74, and a coupling 102 fitted on the other end of the thrust pin is connected by a flexible boot 104 to the open end of the cylinder for the exclusion of dust and other foreign substances from the cylinder. A rod 106 connects the coupling 102 to a foot pedal lever 108 pivotally mounted on a bracket 110 and connected by a retractile spring 112 to a fixed support 114.

In a normal operation, upon depressing the foot pedal lever 108, force is transmitted therefrom through the rod 106 and thrust pin 100 to the piston 74, resulting in movement of the piston on its compression stroke. During the initial movement of the piston on its compression stroke, the cup 96 covers the port 22, and, thereafter, as the piston 74 proceeds on its compression stroke, the piston 62 is advanced to its maximum allowable and the fluid in the cylinder forward of the piston 74 is displaced therefrom through the channels 72 in the piston 62, past the lip 68 into the shell, thence through the ports 54 in the shell, the discharge port 26, and the fluid pressure delivery pipe or conduit 34 and its respective branches into the fluid pressure actuated motors 36, causing energization of the motors and the consequent actuation of the shoes 42 into engagement with the drums 40 against the resistance of the retractile springs 44 to effectively retard rotation of the drums.

Upon completion of a braking operation, the foot pedal lever 108 is released and returns to its retracted position under the influence of the retractile spring 112. This results in releasing the piston 74 and return of the piston to its retracted position under the influence of the spring 98 and the pressure on the fluid acting on the piston 62. As the piston 74 returns to its retracted position, a partial vacuum is created in the cylinder 18 forward of the piston 74. This results in drawing fluid from the reservoir 10 through the port 20 into the annular chamber 84, thence through the passages 94 in the head of the piston past the sealing cup 96 into that portion of the cylinder forward of the piston, so as to completely fill the cylinder. Simultaneously with this operation, fluid is returning to the cylinder from the motors 36 and the fluid pressure delivery pipe 34 and its respective branches under the influence of the retractile springs 44 connecting the shoes 42 of the brakes.

During this operation the piston 62 recedes, due to the pressure on the fluid in the fluid pressure delivery pipe 34, its branches, and the motors connected thereto until the lip 68 on the piston 62 uncovers the ports 50 so as to establish communication between that portion of the cylinder forward of the piston 74 and the shell 46. When the pressure on the fluid in the pressure delivery pipe 34, its branches, and the motors 36, drops to a predetermined pressure corresponding to the load on the spring 98, the piston 62 is balanced to close the ports 50 so as to maintain a constant pressure on the fluid in the fluid pressure delivery pipe 34, the branches thereof, and the motors connected to the branches. It is, of course, understood that the spring 98 may yield, due to expansion of the fluid in the system so as to relieve the pressure on the fluid. It is also to be understood that the fluid returned to the cylinder may be in excess of the quantity necessary to completely fill the cylinder, and in that event the excess fluid is displaced therefrom through the port 22 into the reservoir.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is,

1. A fluid pressure producing device comprising a reservoir, a cylinder supplied therefrom having a discharge port, a piston movable in the cylinder for creating pressure, a cylindrical member secured in the cylinder adjacent the discharge port including a raised portion, passages in the member, a floating piston in the member adapted to control the passages in the member and limited in movement in one direction by the raised portion on the member, and a spring interposed between the pistons.

2. A fluid pressure producing device comprising a cylinder, a piston movable in the cylinder for creating pressure, a hollow cylinder fixedly secured in the cylinder including a base having an inner inverted portion, passages through the base and wall of the hollow cylinder, a floating elastic piston reciprocable in the hollow cylinder limited in movement in one direction by the inverted portion of the hollow cylinder, means on the elastic piston for by-passing fluid in one direction and cooperating with the passages in the hollow cylinder for by-passing fluid in the other direction, and resilient means between the pistons.

3. A fluid pressure producing device comprising a reservoir, a cylinder supplied therefrom having a discharge port and a section of reduced diameter adjacent the discharge port, a piston movable in the cylinder for creating pressure, a cylindrical member fixedly secured in that portion of the cylinder having the reduced diameter including a base having a raised inner portion, passages through the wall and base of the member, a floating rubber piston reciprocable in the member having passages therein, a marginal flange on the floating piston for control of the passages therein and the passages in the wall of the cylindrical member for by-passing fluid past the floating piston in two directions, means for reciprocating the piston, and a resilient means between the pistons.

4. A fluid pressure producing device comprising a cylinder, a piston movable therein for creating pressure, a cylindrical insert in the cylinder including a base having a raised inner portion, passages through the wall and base of the insert, an annular groove between the cylinder and insert adjacent passages in the wall of the insert, an elastic piston reciprocable in the insert limited in movement in one direction by the raised portion on the base of the insert, circumferential grooves in the elastic piston, a marginal flange on the elastic piston providing a fluid by-pass through the piston in one direction and cooperating with the passages in the wall of the insert to provide a fluid by-pass in the other direction, and spring means interposed between the pistons yieldingly resisting movement of the piston in one direction.

5. A fluid pressure system comprising a fluid pressure producing device including a cylinder having a discharge port therethrough, a piston reciprocable therein, means for reciprocating the piston, a cylindrical shell fixedly secured in the cylinder including a base, passages through the wall and base of the shell, a floating piston reciprocable in the shell limited in movement in one direction by the base of the shell, a fluid pressure actuated motor connected to the cylinder, means yieldingly resisting activation of the motor, means in the floating piston for by-passing fluid in one direction, means on the floating piston cooperating with the shell for by-passing fluid in the other direction, and means between the pistons coacting with the yielding means to maintain a positive pressure on the fluid in the system.

6. A fluid pressure system comprising a cylinder, a piston reciprocable therein, means for activating the piston, a cylindrical member secured in the cylinder including a base, passages in the wall and base of the cylinder, a floating elastic piston reciprocable in the member including longitudinal grooves in the circumference and a marginal flange yieldingly embracing the wall of the member, said marginal flange providing a by-passing of fluid through the grooves in one direction and adapted to cooperate with the passages in the wall of the member for by-passing fluid in the other direction, a fluid pressure actuated motor connected to the cylinder, apparatus actuated by the motor, means for retracting the apparatus and motor, means on the base of the member for limiting forward movement of the floating piston, and means between the pistons cooperating with the retracting means for maintenance of a positive pressure on the fluid in the system.

ERWIN F. LOWEKE.